(12) United States Patent
Liu

(10) Patent No.: US 9,736,794 B1
(45) Date of Patent: Aug. 15, 2017

(54) DYNAMIC ANTENNA REFERENCE SIGNAL TRANSMISSION

(71) Applicant: T-Mobile USA, Inc., Bellevue, WA (US)

(72) Inventor: Jun Liu, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/085,056

(22) Filed: Mar. 30, 2016

(51) Int. Cl.
| H04M 1/00 | (2006.01) |
|---|---|
| H04W 52/32 | (2009.01) |
| H04W 4/06 | (2009.01) |
| H04W 52/02 | (2009.01) |

(52) U.S. Cl.
CPC ........... H04W 52/325 (2013.01); H04W 4/06 (2013.01); H04W 52/0274 (2013.01)

(58) Field of Classification Search
CPC ...... H04B 7/04; H04B 7/0691; H04B 7/0874; H04L 5/0023; H04L 5/0048; H04L 5/005; H04W 16/14; H04W 16/32; H04W 48/10; H04W 48/12; H04W 48/20; H04W 72/042; H04W 72/0453; H04W 84/045
USPC .......... 455/562.1, 557, 425, 407, 63.1, 41.2, 455/552.1, 522, 69, 66.1, 466, 13.1; 370/329, 340, 252, 280
See application file for complete search history.

(56) References Cited

U.S. PATENT DOCUMENTS

| 6,804,537 | B1 * | 10/2004 | Fujii | H04M 1/72561 |
|---|---|---|---|---|
| | | | | 455/407 |
| 8,254,487 | B2 * | 8/2012 | Tsai | H04B 1/59 |
| | | | | 375/220 |
| 9,270,346 | B2 | 2/2016 | Ahmadi | |
| 2006/0105771 | A1 * | 5/2006 | Iacono | H04W 16/28 |
| | | | | 455/446 |
| 2006/0205356 | A1 * | 9/2006 | Laroia | H04B 7/0811 |
| | | | | 455/66.1 |

(Continued)

FOREIGN PATENT DOCUMENTS

| EP | 2991239 | 3/2016 |
|---|---|---|
| WO | WO2007111631 | 10/2007 |
| WO | WO2014107012 | 7/2014 |

OTHER PUBLICATIONS

PCT Search Report and Written Opinion dated Jun. 27, 2017 for PCT Application No. PCT/US17/23529, 12 pages.

*Primary Examiner* — Tan H Trinh
(74) *Attorney, Agent, or Firm* — Lee & Hayes, PLLC

(57) ABSTRACT

The techniques described herein manage the transmission of reference signals on associated antennas of a cell site based on network conditions (e.g., the load of user data being transmitted via down-link (DL) transmissions). A reference signal includes control channel information that mobile devices are able to use to identify a particular cell and/or determine whether the particular cell is suitable for "camping" or "idling". The techniques are configured to dynamically activate and/or de-activate various ones of multiple antennas, so that an inactive antenna does not broadcast reference signals. Rather, the techniques described herein configure a subset (e.g., one antenna) of a larger set of antennas (e.g., two antennas or four antennas) of a cell site to transmit reference signals so that the likelihood of control channel interference between neighboring cell sites is reduced.

18 Claims, 6 Drawing Sheets

(56) References Cited

U.S. PATENT DOCUMENTS

| | | | |
|---|---|---|---|
| 2010/0226337 A1* | 9/2010 | Yang | H04B 7/0615 370/330 |
| 2011/0319025 A1* | 12/2011 | Siomina | H04B 7/024 455/63.1 |
| 2012/0014349 A1* | 1/2012 | Chung | H04B 7/0684 370/329 |
| 2012/0082192 A1* | 4/2012 | Pelletier | H04W 52/42 375/219 |
| 2012/0106374 A1* | 5/2012 | Gaal | H04L 5/0048 370/252 |
| 2012/0315948 A1* | 12/2012 | Frenger | H04W 52/0232 455/522 |
| 2012/0329395 A1* | 12/2012 | Husted | H04B 1/406 455/41.2 |
| 2013/0039284 A1* | 2/2013 | Marinier | H04L 5/001 370/329 |
| 2013/0128761 A1* | 5/2013 | Kang | H04W 72/046 370/252 |
| 2013/0142288 A1* | 6/2013 | Dinan | H04L 27/2649 375/340 |
| 2013/0201946 A1* | 8/2013 | Lunttila | H04W 24/02 370/329 |
| 2013/0210491 A1* | 8/2013 | Eriksson | H04W 16/24 455/562.1 |
| 2014/0242918 A1 | 8/2014 | Weissman et al. | |
| 2014/0362744 A1* | 12/2014 | Yan | H04B 7/26 370/280 |
| 2014/0376459 A1* | 12/2014 | Kanamarlapudi | H04B 7/26 370/329 |
| 2015/0281973 A1* | 10/2015 | Svedman | H04B 7/0691 455/454 |
| 2016/0088512 A1* | 3/2016 | Bergstrom | H04W 28/0263 370/330 |
| 2016/0112173 A1* | 4/2016 | Wang | H04L 5/0048 370/329 |
| 2016/0204921 A1* | 7/2016 | Kim | H04L 12/189 370/312 |
| 2016/0248496 A1* | 8/2016 | Bellamkonda | H04B 7/0413 |
| 2016/0254889 A1* | 9/2016 | Shattil | H04L 5/0035 370/329 |
| 2016/0269978 A1* | 9/2016 | Bashar | H04J 11/00 |

\* cited by examiner

500

```
┌─────────────────────────────────────────────────────┐
│ CONFIGURE A SUBSET OF ACTIVE ANTENNA(S) OF A LARGER SET OF │
│ ANTENNAS AT AN INDIVIDUAL CELL SITE TO CONTINUALLY TRANSMIT │
│              REFERENCE SIGNALS                      │
│                    502                              │
└─────────────────────────────────────────────────────┘
                         ↓
┌─────────────────────────────────────────────────────┐
│ RECEIVE REQUEST(S) TO TRANSMIT DATA FROM MOBILE DEVICE(S) │ ←┐
│                    504                              │   │
└─────────────────────────────────────────────────────┘   │
                         ↓                                │
┌─────────────────────────────────────────────────────┐   │
│     EVALUATE INFORMATION ASSOCIATED WITH THE REQUEST(S) │ ─┘
│                    506                              │
└─────────────────────────────────────────────────────┘
                         ↓
┌─────────────────────────────────────────────────────┐
│ ACTIVATE, BASED ON THE EVALUATION, ADDITIONAL ANTENNA(S) IN THE │
│                  SET OF ANTENNAS                    │
│                       508                           │
└─────────────────────────────────────────────────────┘
                         ↓
┌─────────────────────────────────────────────────────┐
│  CONFIGURE THE ADDITIONAL ACTIVE ANTENNA(S) TO TRANSMIT │
│               REFERENCE SIGNALS                     │
│                    510                              │
└─────────────────────────────────────────────────────┘
                         ↓
┌─────────────────────────────────────────────────────┐
│  CONFIGURE THE SET OF ACTIVE ANTENNAS TO TRANSMIT THE DATA │
│              REQUESTED IN PARALLEL                  │
│                    512                              │
└─────────────────────────────────────────────────────┘
```

FIG 5

DYNAMIC ANTENNA REFERENCE SIGNAL TRANSMISSION

BACKGROUND

Modern telecommunication systems include heterogeneous mixtures of second, third, and fourth generation (2G, 3G, and 4G) cellular-wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

A cellular-wireless network (e.g., may also be referred to as mobile telephone network) includes multiple communication cells or "cells", where an individual cell is associated with an area of coverage. A cell may be served by one or more fixed location transceivers (e.g., transmitter(s) and receiver(s)) equipped in a base station. The fixed location transceivers and the base station, along with other equipment and components, may collectively be referred to as a cell site.

Recently, cellular-wireless access technologies, particularly 4G telecommunications technologies (e.g., LTE, LTE Advanced, etc.), have begun to implement multiple-input and multiple-output (MIMO), which uses multiple antennas to exploit multipath propagation and to increase data throughput (e.g., down-link data throughput). For instance, an individual cell site may implement a "4×2" MIMO implementation in which four (4) transmitting antennas are used to transmit information to mobile devices (e.g., data pushed to a mobile device or data requested by a mobile device) and two (2) receiving antennas are used to receive information from mobile devices.

However, cellular-wireless access technologies that implement MIMO often experience interference that causes system level performance degradation in a mobile telephone network. More specifically, control channel interference occurs when the transmissions of first reference signals from the transmitting antennas of a first cell site interfere with the transmissions of second reference signals from the transmitting antennas of a second cell site that neighbors the first cell site. The interference occurs because the neighboring cell sites often use the same frequency bands and because the coverage areas of the neighboring cell sites often overlap.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 5 is a flow chart of an example process for determining that inactive antennas are to be activated to transmit reference signals and/or user data to mobile devices.

DETAILED DESCRIPTION

Figure 1:
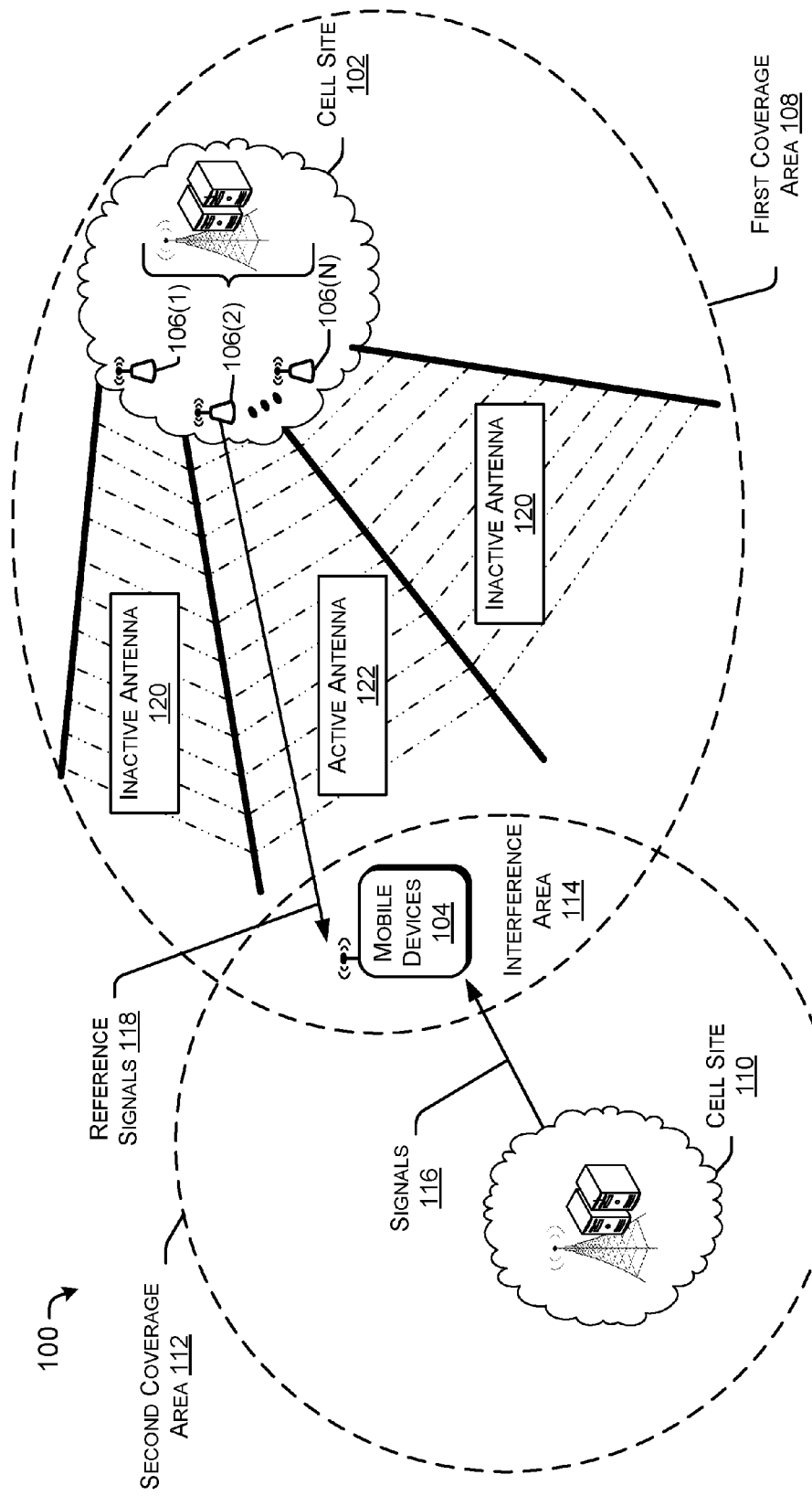
FIG. 1 depicts an illustrative environment in which a cell site determines to transmit reference signals on an active antenna and to not transmit reference signals on one or more inactivate antennas to avoid control channel interference between neighboring cell sites.

The techniques described herein manage the transmission of reference signals on associated antennas of a cell site based on network conditions (e.g., the load of user data being transmitted via down-link (DL) transmissions). A reference signal includes control channel information that mobile devices are able to use to identify a particular cell and/or determine whether the particular cell is suitable for "camping" or "idling". Stated another way, a mobile device uses the reference signal to find or locate a cell to use when the mobile device wants to receive and/or transmit data. The reference signal may additionally or alternatively be referred to as a pilot signal or a broadcast signal, and may include: a cell identifier (e.g., a unique identifier or a unique code), a frequency band used by the cell, a power control indicator, and other information that mobile devices can evaluate to determine which cell to use. Thus, at least one purpose of the reference signal is to broadcast and/or to deliver a reference point for down-link (DL) power. The reference signal is mapped to antenna port (e.g., an antenna) of the base station.

As used herein, a "cell" is associated with a portion of spectrum (e.g., a set of frequencies). Accordingly, a first cell may differ from a second cell by being associated with a different base station (e.g., a different cell site) or by using a different portion of spectrum. Stated another way, the first cell and the differing second cell: (i) may be served by the same base station, but may use different portions of spectrum, (ii) may be served by different base stations configured to cover separate geographic areas but may use the same portion of spectrum on the different base stations (although there may be some overlap in coverage areas that lead to interference), (iii) may be served by different base stations and may use different portions of spectrum, or (iv) in some instances, differing cells may be served by the same base station, and may use the same portion of spectrum distinguished by different reference signals.

The techniques described herein manage the transmission of reference signals on associated antennas by dynamically activating and/or de-activating various ones of multiple antennas (e.g., transmitting antennas), so that an inactive antenna does not broadcast reference signals. Rather, the techniques described herein configure a subset (e.g., one antenna) of a larger set of antennas (e.g., two antennas or four antennas) of a cell site to transmit reference signals so that the likelihood of control channel interference between neighboring cell sites is reduced.

Conventionally, each antenna of a cell site continually transmits reference signals regardless of the amount of data traffic (e.g., even when there is no data traffic on the cell site). Since all the antennas continually transmit reference signals, there is an increased likelihood that the reference signals transmitted by all the antennas of a first cell site will interfere with reference signals transmitted by the all the antennas of a second cell site. For example, if four antennas of a cell site are all transmitting reference signals, then the transmissions are spread across a wider range of frequencies and the likelihood of interference with signals from antennas of a neighboring cell site increases.

FIG. 1 depicts an illustrative environment 100 in which a cell site 102 determines to transmit reference signals on an active antenna and to not transmit reference signals on one or more inactive antennas to avoid control channel interference between neighboring cell sites. The cell site 102 includes a base station, and is part of a mobile telecommunications network (MTN), that ultimately enables mobile devices 104 to access data servers (e.g., Web servers, content servers, file servers, mail servers, etc.).

To this end, an individual mobile device 104, which may be referred to herein as user equipment (UE), may include, but is not limited to: a smartphone device, a cell phone device, a tablet computer device, a laptop computer device, a mobile hotspot device, a personal digital assistant (PDA) device, an electronic book device, a handheld gaming device, a personal media player device, or any other portable or mobile electronic device that may generate voice and/or digital data, request voice and/or digital data over an MTN, receive voice and/or digital data over an MTN, and/or exchange voice and/or digital data over an MTN. Moreover, a mobile device 104 may operate in accordance with a service or a subscription plan offered by a commercial cellular service provider and purchased by a user of the mobile device 104. For instance, a mobile device 104 configured in association with a T-Mobile® service plan may include hardware/software (e.g., a subscriber identity module (SIM) card) that directs the mobile device 104 to search for a cell that belongs to T-Mobile®. If a cell that belongs to T-Mobile® cannot be found, the mobile device may search for a cell that belongs to an entity that has partnered with T-Mobile® to provide cellular service in a coverage area where T-Mobile® has no allocated spectrum.

The MTN may be configured to implement one or more of the second, third, and fourth generation (2G, 3G, and 4G) cellular-wireless access technologies described above. Thus, the MTN may implement GSM, UMTS, and/or LTE/LTE Advanced telecommunications technologies. Different types of MTN nodes used in the GSM, UMTS, LTE, LTE Advanced, and/or HSPA+ telecommunications technologies may include, but are not limited to, a combination of: base stations (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate and/or route data between (i) a mobile device 102 and (ii) peer mobile device(s) or data servers, for example. It is understood in the context of this document, that the techniques discussed herein may also or alternatively be implemented in association with other networking technologies as well, such as nodes that are part of a wide area network (WAN), metropolitan area network (MAN), local area network (LAN), neighborhood area network (NAN), personal area network (PAN), or the like.

As described above, the cell site 102 can comprise multiple antennas (e.g., MIMO), including antennas 106(1) . . . 106(N) configured to transmit (e.g., broadcast) reference signals throughout a first coverage area 108, where N is a positive integer (e.g., two, three, four, five, etc.). FIG. 1 also illustrates a second cell site 110 that is a neighbor to cell site 102. The second cell site 110 also includes antennas configured to transmit reference signals throughout a second coverage area 112. Because the cell sites are neighbor cell sites, there may be an area where the coverage areas overlap and interference is more likely to occur (e.g., the interference area 114). For example, mobile devices 104 located in the interference area 114 may detect signals 116 (e.g., reference signals) from cell site 110 that interfere with reference signals 118 from cell site 102.

To reduce the likelihood that mobile devices 104 experience interference while located in the interference area 114, components of the cell site 102 are configured to determine a current amount of user data (e.g., video data, web data, gaming data, electronic mail data, etc.) being exchanged (e.g., DL transmissions), and if there is no user data or a limited amount of user data being exchanged, then the components of the cell site 102 de-activate at least some of the antennas 106(1) and 106(N) so they no longer transmit reference signals. Rather, the cell site 102 only uses a subset (e.g., antenna 106(2)) of a total number of available antennas 106(1) . . . 106(N) to transmit reference signals 118. Accordingly, FIG. 1 illustrates that antennas 106(1) and 106(N) are "inactive" antennas 120, while antenna 106(2) is an "active" antenna 122 that continually transmits reference signals 118 so mobile devices (e.g., mobile devices 104 or other mobile devices within coverage area 108) can identify a cell associated with cell site 102 and camp on the identified cell while in an idle mode of network operation.

Consequently, the potential for interference is greatly reduced because all the antennas 106(1) . . . 106(N) are no longer being used to transmit reference signals across a wide range of frequencies when there is no or limited user data being transmitted to the mobile devices 104 or other mobile devices within the first coverage area 108. Instead of exchanging user data, the mobile devices 104 in the interference area 114, or other mobile devices within the first coverage area 108, are only camping or idling. Therefore, a smaller subset of antennas (e.g., one antenna 106(2)) remains active to transmit reference signals, and power consumption at the cell site 102 can be reduced since not all the antennas 106(1) . . . 106(N) are always transmitting reference signals.

Figure 2:
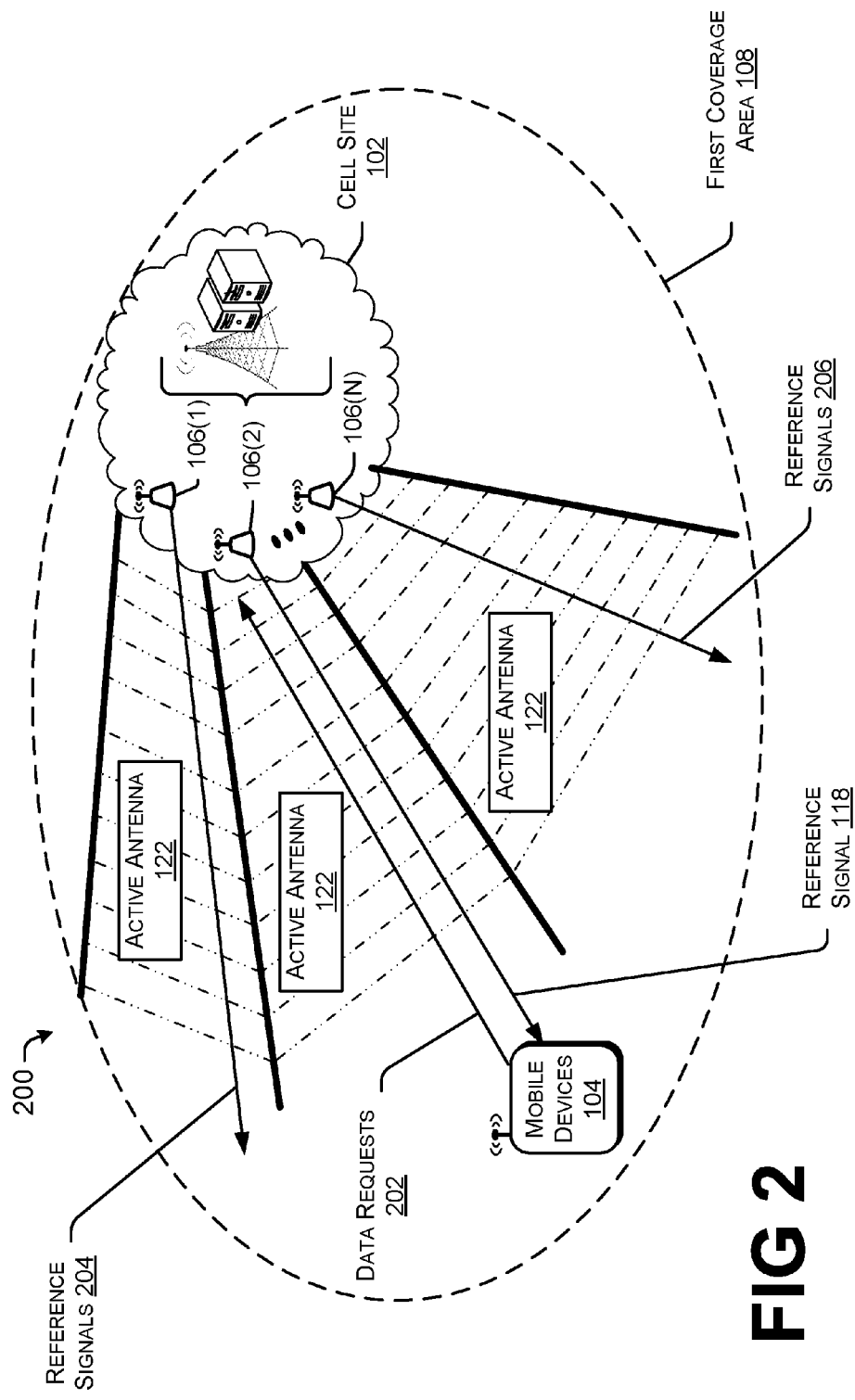
FIG. 2 depicts an illustrative environment in which a cell site determines to activate multiple antennas to transmit reference signals so that mobile devices can identify the multiple antennas and user data can subsequently be transmitted to the mobile devices via the use of multiple antennas (e.g., via down-link (DL) transmissions).

FIG. 2 depicts an illustrative environment 200 in which a cell site 102 determines to activate multiple antennas (e.g., all the antennas 106(1) . . . 106(N)) to transmit reference signals so that the mobile devices 104 or other mobile devices within the first coverage area 108 can identify the multiple antennas and, once identified, user data can subsequently be transmitted to the mobile devices via the use of multiple antennas (e.g., DL transmissions).

The cell site 102 can determine that user data is to be exchanged. In various examples, the cell site 102 is configured to make this determination based on data requests 202 received from mobile device 104. As described above with respect to FIG. 1, since antenna 106(2) is an active antenna 122 while other antennas 106(1), 106(N) are inactive antennas 120, the mobile devices 104 or other mobile devices within the first coverage area 108 still have a means to provide data requests 202. For instance, upon being switched on within, or upon entering, the first coverage area 108, a mobile device 104 may look through a spectrum band to receive reference signals 118 being broadcast by the antenna 106(2) and to identify a suitable cell to monitor or listen to while in an idle or camping mode of network operation (e.g., the identified cell being associated with antenna 106(2)). After identifying a cell to monitor, the mobile device 104 is aware of control channel parameters (e.g., a frequency band) that can be used in an event the mobile device 104 wants to initiate communications with the cell site 102 (e.g., a voice call, a text message, a request to download data or to upload data, etc.). Stated another way, the mobile device 104 may use the control channel parameters provided via the reference signals 118 to prepare for communications with the cell site 102 (e.g., the base station).

Consequently, when the cell site 102 determines that mobile devices 104 or other mobile devices within the first coverage area 108 have requested that data be downloaded (e.g., via DL transmissions), then the cell site 102 activates antennas that were previously inactive (e.g., FIG. 2 illustrates that antennas 106(1) and 106(N) are now active antennas 122). In response to being switched from an inactive state to an active state, antenna 106(1) is configured to transmit its own reference signals 204 so the mobile devices 104 can identify cell(s) served by antenna 106(1), and similarly, antenna 106(N) is configured to transmit its own reference signals 206 so the mobile devices 104 can identify cell(s) served by antenna 106(N). This way, a larger set of antennas (e.g., all the antennas 106(1) . . . 106(N) of a base station) can be used simultaneously (e.g., in parallel) for DL transmissions so increased data throughput is realized and the system level performance in the mobile telephone network is maintained.

Figure 3:
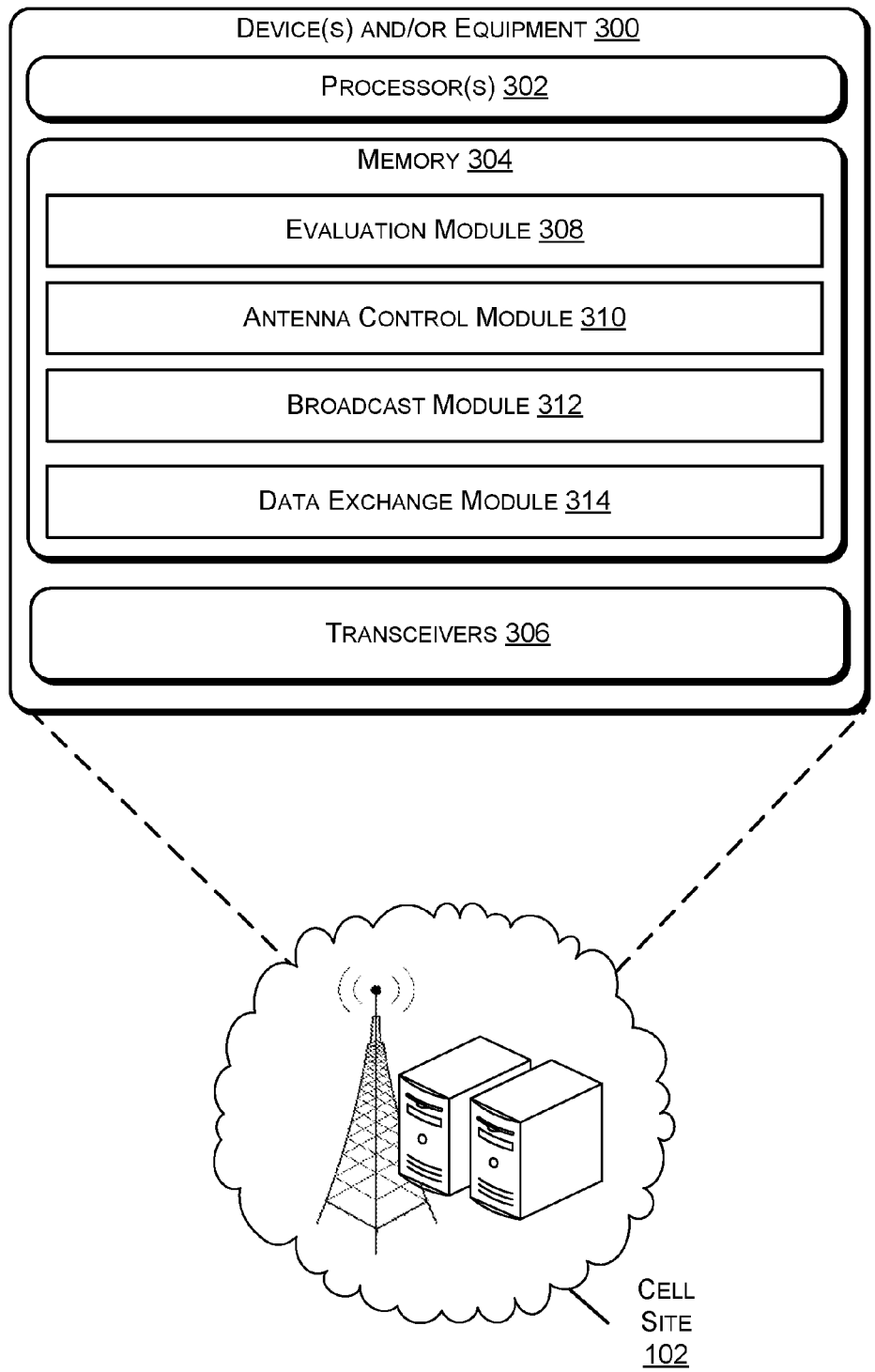
FIG. 3 depicts example components of a cell site that is configured to activate and de-activate antennas to avoid control channel interference between neighboring cell sites.

FIG. 3 illustrates example components of device(s) and/or other equipment 300 configured at, or in association with, a cell site (e.g., cell site 102). For example, a base station can be associated with one or more devices. A device can be located locally at the cell site or a device can be located remotely yet control the base station via network communications.

A device can include one or more processor(s) 302 and memory 304. The device or equipment associated with the device can include transceivers 306 (e.g., antennas), as described above. Processor(s) 302 may include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 302 may be configured to fetch and execute computer-readable instructions stored in the memory 304.

The memory 304 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transmission mechanism.

The memory 304 can include one or more of: an evaluation module 308, an antenna control module 310, a broadcast module 312, and/or a data exchange module 314. As used herein, the term "module" is intended to represent example divisions of executable instructions for purposes of discussion, and is not intended to represent any type of requirement or required method, manner or organization. Accordingly, while various "modules" are discussed herein with respect to FIG. 3, their functionality and/or similar functionality could be arranged differently (e.g., combined into a fewer number of modules, broken into a larger number of modules, etc.). Further, while certain functions and modules may be described herein as being implemented by software and/or firmware executable on a processor, in other embodiments, any or all of the modules may be implemented in whole or in part by hardware (e.g., a specialized processing unit, etc.) to execute the described functions.

In various implementations, the evaluation module 308 is configured to monitor network conditions and evaluate the conditions so that antennas of a cell site can be dynamically managed and controlled (e.g., activated, de-activated, etc.). For example, the evaluation module 308 is configured to monitor for and determine an amount of data being exchanged (e.g., DL transmissions, UL transmissions, etc.) with mobile devices in a coverage area of the cell site. If there is no data being exchanged (e.g., all the mobile devices in the coverage area are camping in an idle mode of network operation), or if the amount of data is a limited amount (e.g., below a defined threshold), then the evaluation module 308 determines that some of the antennas (e.g., antenna 106(1) and/or antenna 106(N)) can be de-activated so that they no longer continually transmit reference signals, as illustrated in FIG. 1. In another example, while some antennas are inactive, the evaluation module 308 is configured to evaluate information associated with requests from mobile devices within the coverage area of a cell site to determine if the antennas in the inactive state should be switched to an active state to enable high capacity data throughput via the use of multiple active antennas. Stated another way, the evaluation module 308 determines that mobile devices want to exchange data (e.g., download data via the cell site), and thus, additional antennas should be activated.

In various examples, the antenna control module 310 is configured to use the evaluations and analysis of the evaluation module 308 to activate and/or de-activate antennas. As described above, at least one antenna (e.g., antenna 106(2)) is always configured to transmit reference signals so that mobile devices are able to identify a cell and camp. In one example, an antenna may be configured as a primary antenna (e.g., primary antenna 106(2)). Thus, the antenna control module 310 de-activates antennas when the evaluation module 308 determines that there is little or no data being exchanged with mobile devices and the antenna control module 310 activates antennas when the evaluation module 308 determines that data is to be exchanged (e.g., mobile devices have requested to download data and/or upload data). In some instances, since the evaluation module 308 is continually monitoring and evaluating the information, the dynamic switching of antennas between states (e.g., active and inactive) can be implemented within small amounts of time (e.g., milliseconds, seconds, tens of seconds, etc.) such that the an antenna can be activated, inactivated, and then activated again over a short period of time (e.g., a few seconds, ten seconds, thirty seconds, a minute, etc.).

In various examples, the broadcast module 312 is configured to determine which antennas are active, or activated by the antenna control module 310, and to have the active antennas broadcast reference signals (e.g., reference signals 118, reference signals 204, reference signals 206) so that mobile devices 104 can identify cells and use multiple cells and multiple antennas to download data.

In various examples, the data exchange module 314 is configured to implement DL transmissions of data and UP transmissions of data with mobile devices that want to exchange data (e.g., mobile devices that have used the reference signals to register with a base station).

Figure 4:
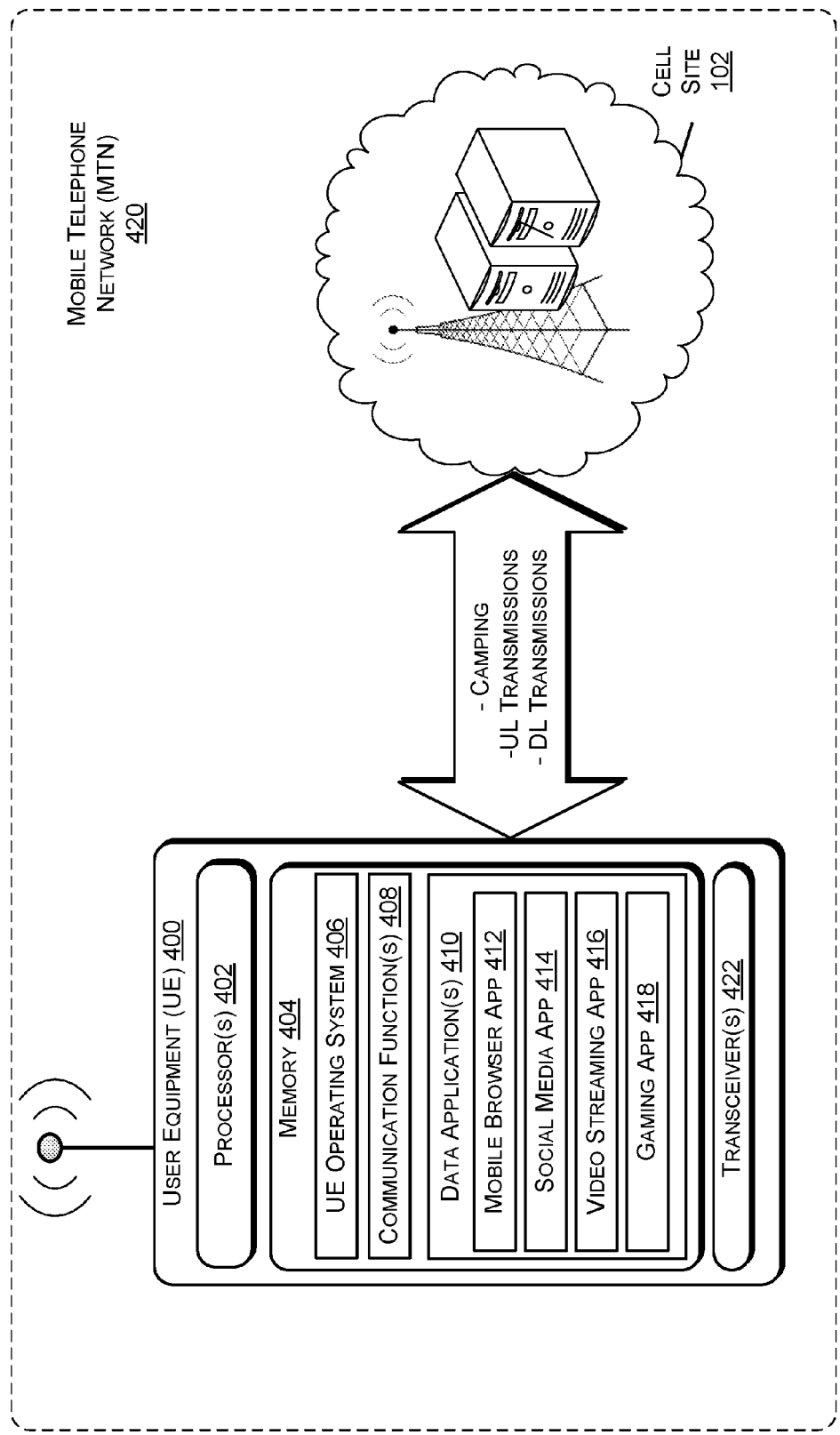
FIG. 4 depicts example components of a mobile device that is configured to communicate with a cell site.

FIG. 4 illustrates example components of a mobile device, such as one of mobile devices 104 (e.g., a user equipment 400). For example, the UE 400 may include one or more processor(s) 402 and memory 404. Various types of processor(s) 402 and memory 404 are discussed above with respect to the processor(s) and the memory of FIG. 3. The memory 404 of the UE 400 can include an operating system (OS) 406, which is configured to manage hardware and services within and coupled to the UE 400 for the benefit of other modules or components. For instance, the OS 406 may include, but is not limited to, a Microsoft Windows Mobile® OS, a Google Android® OS, an Apple iOS® OS, a Linux Mobile® OS, as well as any other common mobile device OS.

The memory 404 may also store module(s) associated with communication function(s) 408 (e.g., voice calls, text messaging, data exchange via TCP/IP, etc.). Additionally, the memory 404 may include data application(s) 410. For example, the data applications 410 may include, but are not limited to, a mobile browser application 412, a social media application 414, a video streaming application 416, a gaming application 418. Other types of applications may include a video conferencing application, an email application, a banking application, or any other application that is configured to generate and exchange data with data servers over a mobile telephone network (MTN) 420, the MTN including cell site 102. During execution by the processor(s) 502 of the UE 500, each of the data applications 110 may be configured to cause the UE 500 to initiate data communications with the data servers 108 over the MTN 106 and via a base station 104.

The UE 400 can also comprise one or more transceiver(s) 422. A transceiver 422 is configured to register the UE 400 with a network, for example, via a base station of the cell site 102. Moreover, the transceiver 422 is configured to receive reference signals broadcast from the antennas of the cell site 102 and use the control channel information in the reference signals to camp on a cell, and initialize data exchange including DL transmissions and up-link (UL) transmissions.

In various implementations, user equipment 400 is enabled to implement carrier aggregation. Carrier aggregation enables a UE to use spectrum allocated to more than one cell. Carrier aggregation may be used in order to increase bandwidth for up-link and/or down-link transmissions, thereby improving speed associated with cellular communications.

Figure 6:
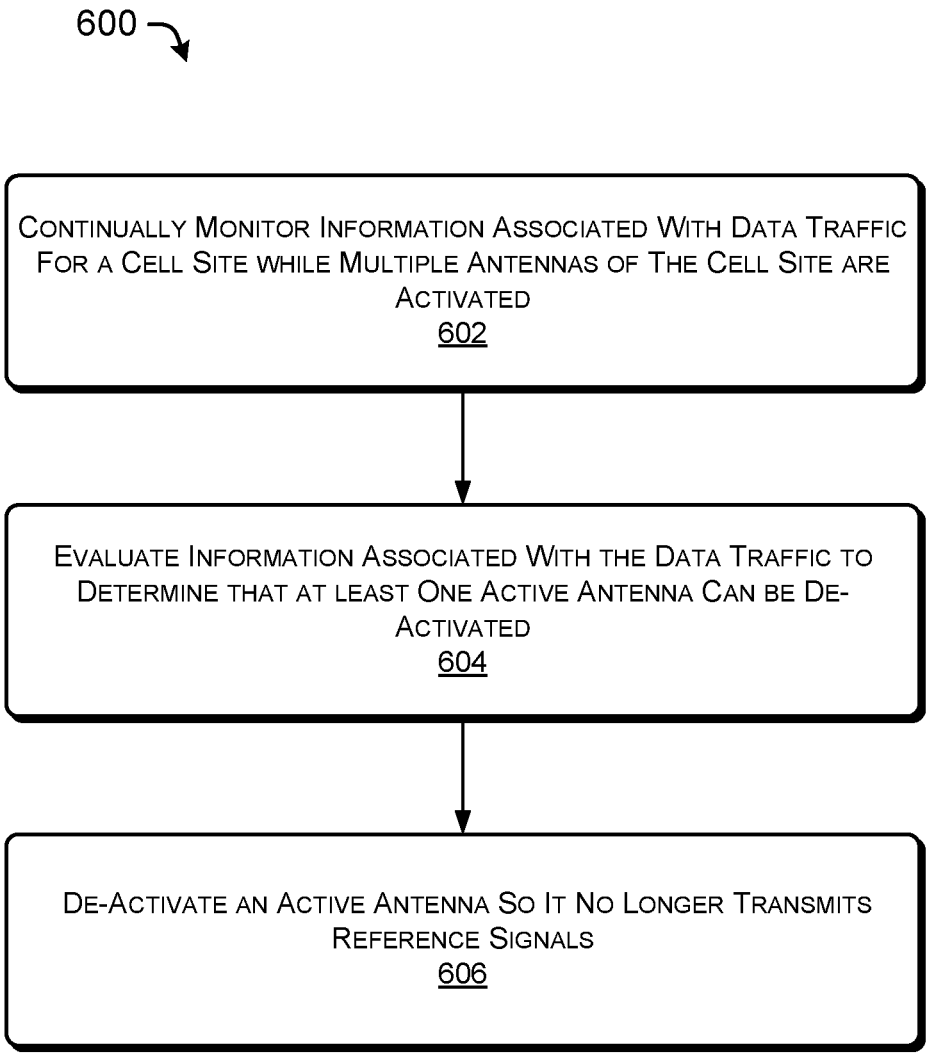
FIG. 6 shows a flow diagram of an example process for determining that active antennas are to be de-activated so that reference signals will no longer be transmitted to mobile devices and control channel interference can be avoided.

FIGS. 5 and 6 present illustrative processes, where each process is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes in FIGS. 5 and 6 may be implemented in association with the description of any one of FIGS. 1-4.

FIG. 5 shows a flow diagram of an example process 500 for determining that inactive antennas are to be activated to transmit user data to mobile devices. The example process 500 may be performed by the components (e.g., the modules) of the devices and equipment 300 associated with a cell site (e.g., cell site 102). However, the example process 500 may be performed by other devices as well.

At 502, a subset of active antenna(s) is configured at an individual cell site to continually transmit (e.g., broadcast) reference signals. The subset of antenna(s) is part of a larger set of antennas configured at the cell site. For example, the subset of antennas can include one antenna (e.g., antenna 106(2)) that transmit reference signals during a time period when mobile devices (e.g., mobile devices 104) within a coverage area (e.g., the first coverage area 108) are camping and are not exchanging data. In other examples, the subset of antennas can include more than one antenna (e.g., two, three, etc.) but not all the available antennas of a cell site. Not all the antennas in the larger set of antennas are active so that the likelihood of control channel interference can be reduced. Moreover, not all the antennas in the larger set of antennas are active so that power consumption at the cell site can be reduced.

At 504, request(s) to transmit data are received from mobile devices via the subset of active antenna(s) and/or via the use of the reference signals transmitted by the subset of active antenna(s). For example, a request may be associated with downloading one or more of web data, social media data, video data, gaming data, a new app, an operating system update, etc.

At 506, information associated with the request(s) is evaluated. For instance, the evaluation module 308 may determine that the requests may not benefit from higher data throughput associated with multiple active antennas, and thus, there is no need to active additional antennas. However, in many cases, the evaluation module 308 determines that the requests will benefit from higher data throughput associated with multiple active antennas. The example process 500 illustrates an arrow that returns to 504 such that operations 504 and 506 can continually be implemented.

At 508, additional antenna(s) in the set of antennas are activated based on the evaluation. For instance, based on a determination that the requests will benefit from higher data throughput associated with multiple active antennas, the antenna control module 310 identifies individual antennas that are currently inactive (e.g., antenna 106(1) and/or antenna 106(N) in FIG. 1), and switches their state so there are now multiple active antennas (e.g., each of antennas 106(1) . . . 106(N) as illustrated in FIG. 2).

At 510, the additional active antenna(s) recently activated are configured to transmit their own reference signals so that mobile devices can identify cells served by the additional active antenna(s).

At 512, the set of antennas (e.g., all the antennas or the full set of antennas) is configured to transmit, simultaneously or in parallel, user data that has been requested by one or more mobile devices in the coverage area of the cell site.

FIG. 6 shows a flow diagram of an example process 600 for determining that active antennas are to be de-activated so that reference signals will no longer be transmitted to mobile devices and control channel interference can be avoided. The example process 600 may be performed by the components (e.g., the modules) of the devices and equipment 300 associated with a cell site (e.g., cell site 102). However, the example process 600 may be performed by other devices as well.

At 602, information associated with data traffic for a cell site is continually monitored while multiple antennas of the cell site are activated. For example, the information can include the amount of data being exchanged, the number of mobile devices using the multiple active antennas to exchange data, etc.

At 604, the information associated with the data traffic is evaluated to determine that at least one active antenna can be de-activated. For example, the information evaluated may indicate that mobile devices (e.g., all the mobile devices) within the coverage area of the cell site are camping in an idle mode of network operation and are no longer exchanging data. In another example, the information evaluated may indicate that the data traffic is below a threshold amount of data traffic and does not benefit from the increased data throughput realized by using multiple antennas, and thus, an antenna can be switched from an active state to an inactive state (e.g., de-activated) without degrading the performance level of the network.

At 606, at least one active antenna is de-activated so that it no longer transmits reference signals. In some instances, all but one antenna (e.g., antenna 106(2) in FIG. 1) may be de-activated, or switched to an inactive state. This reduces the likelihood of interference with signals from a neighboring cell site and/or reduces the power consumption at the cell site.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more devices comprising:
one or more processors; and
memory storing instructions that, when executed by the one or more processors, cause the one or more devices to:
configure at least one antenna in a set of antennas to broadcast first reference signals;
receive, from one or more mobile devices and based at least in part on the first reference signals being broadcast, requests to transmit data;
determine, based at least in part on the requests to transmit data, to switch at least one additional antenna in the set of antennas from an inactive operation state to an active operation state, the at least one additional antenna not broadcasting second reference signals while in the inactive operation state;
configure, in response to switching the at least one additional antenna from the inactive operation state to the active operation state, the at least one additional antenna to broadcast the second reference signals;
transmit the data to the one or more mobile devices using the at least one antenna and the at least one additional antenna in parallel;
determine that an amount of data to be transmitted to the one or more devices is below a threshold amount; and
switch, based at least in part on the determination that the amount of data to be transmitted to the one or more devices is below the threshold amount, the at least one additional antenna from the active operation state back to the inactive operation state so that the second reference signals are no longer being broadcast.

2. The one or more devices of claim 1, wherein the requests to transmit data are associated with downloading data from one or more servers to the one or more mobile devices via a mobile telephone network.

3. The one or more devices of claim 1, wherein the at least one antenna comprises a primary antenna of a fixed location cell site that is always configured to broadcast the first reference signals.

4. The one or more devices of claim 1, wherein a reference signal comprises control channel information useable by the one or more mobile devices to identify a particular cell and to camp on the particular cell.

5. The one or more devices of claim 4, wherein the control channel information comprises a cell identifier, a frequency band used by the particular cell, and a power control indicator.

6. The one or more devices of claim 1, wherein determining that the amount of data to be transmitted to the one or more devices is below the threshold amount comprises determining that no additional data is to be transmitted to the one or more devices.

7. The one or more devices of claim 1, wherein the at least one antenna and the at least one additional antenna are part of a same fixed location cell site.

8. A method comprising:
configuring, by one or more processors, at least one antenna in a set of antennas to broadcast first reference signals;
receiving, from one or more mobile devices and based at least in part on the first reference signals being broadcast, requests to transmit data;
determining, by the one or more processors and based at least in part on the requests to transmit data, to activate at least one additional antenna in the set of antennas, the at least one additional antenna, prior to activation, configured to not broadcasting second reference signals;
configuring, by the one or more processors and based at least in part on the determination to activate, the at least one additional antenna to broadcast the second reference signals;
transmitting the data to the one or more mobile devices using the at least one antenna and the at least one additional antenna in parallel;

determining that an amount of data to be transmitted to the one or more devices is below a threshold amount; and de-activating, based at least in part on the determination that the amount of data to be transmitted to the one or more devices is below the threshold amount, the at least one additional antenna so that the second reference signals are no longer being broadcast.

9. The method of claim 8, wherein the requests to transmit data are associated with downloading data from one or more servers to the one or more mobile devices via a mobile telephone network.

10. The method of claim 8, wherein the at least one antenna comprises a primary antenna of a fixed location cell site that is always configured to broadcast the first reference signals.

11. The method of claim 8, wherein a reference signal comprises control channel information useable by the one or more mobile devices to identify a particular cell and to camp on the particular cell.

12. The method of claim 11, wherein the control channel information comprises a cell identifier, a frequency band used by the particular cell, and a power control indicator.

13. The method of claim 8, wherein
determining that the amount of data to be transmitted to the one or more devices is below the threshold amount comprises determining that no additional data is to be transmitted to the one or more devices.

14. The method of claim 8, wherein the at least one antenna and the at least one additional antenna are part of a same fixed location cell site.

15. A system comprising:
a primary antenna that is always configured to broadcast first reference signals;

one or more additional antennas individually configured to be switched between an active operation state and an inactive operation state, wherein an individual additional antenna is configured to broadcast second reference signals while operating in the active operation state and the individual antenna is configured to not broadcast the second reference signals while operating in the inactive operation state; and one or more devices storing instructions that, when executed, configure individual ones of the additional antennas to switch between the active operation state and the inactive operation state based at least in part on whether one or more mobile devices are downloading data or requesting to download data via a mobile telephone network, wherein the instructions further determine that an amount of the data to be downloaded to the one or more mobile devices is below a threshold amount and, based on the at least in part on the determination, switch the individual ones of the additional antennas to the inactive operation state.

16. The system of claim 15, comprised within a single fixed location cell site.

17. The system of claim 15, wherein a reference signal comprises control channel information useable by the one or more mobile devices to identify a particular cell and to camp on the particular cell.

18. The system of claim 17, wherein the control channel information comprises a cell identifier, a frequency band used by the particular cell, and a power control indicator.

* * * * *